(12) United States Patent
Eramian (10) Patent No.: US 9,900,774 B2
(45) Date of Patent: Feb. 20, 2018

(54) SHARED NETWORK CONNECTION CREDENTIALS ON CHECK-IN AT A USER'S HOME LOCATION

(71) Applicant: PAYPAL, INC., San Jose, CA (US)

(72) Inventor: David Edward Eramian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/292,298

(22) Filed: May 30, 2014

(65) Prior Publication Data

US 2015/0350910 A1    Dec. 3, 2015

(51) Int. Cl.
*H04L 29/06* (2006.01)
*H04W 12/08* (2009.01)

(52) U.S. Cl.
CPC .......... *H04W 12/08* (2013.01); *H04L 63/083* (2013.01)

(58) Field of Classification Search
CPC ..... H04W 12/06; H04W 12/08; H04W 84/12; H04W 8/005; H04W 48/00; H04W 48/08; H04W 88/12; H04W 28/16; H04L 63/08; H04L 63/083; H04L 2209/80; H04L 63/10
USPC .......................................................... 726/6
See application file for complete search history.

(56) References Cited

U.S. PATENT DOCUMENTS

| 8,694,782 B2 | 4/2014 | Lambert |
| 2006/0156391 A1 | 7/2006 | Salowey |
| 2007/0280154 A1 | 12/2007 | Gupta et al. |
| 2009/0089565 A1* | 4/2009 | Buchanan et al. ............ 713/1 |
| 2009/0300357 A1* | 12/2009 | Kumar et al. ............ 713/171 |
| 2012/0072976 A1* | 3/2012 | Patil et al. ............ 726/6 |
| 2012/0157058 A1* | 6/2012 | Lowe ............ 455/411 |
| 2013/0309971 A1* | 11/2013 | Kiukkonen ......... H04L 63/107 455/41.2 |
| 2014/0068719 A1* | 3/2014 | Kiukkonen et al. ........... 726/4 |

FOREIGN PATENT DOCUMENTS

WO    WO 2013160525 A1 * 10/2013 ............ H04W 12/04

* cited by examiner

*Primary Examiner* — Yogesh Paliwal
(74) *Attorney, Agent, or Firm* — Haynes and Boone, LLP (57) ABSTRACT

There are provided systems and methods for shared network connection credentials on check-in at a user's home location. A user may have a wireless network for accessing the Internet, such as a WiFi router, at a location for the user. The wireless network may be password protected to prevent unauthorized used. However, the user may further provide a beacon at the location for the location for the wireless network that provides short range wireless communications including a check-in option for other users visiting the location. Once the other users have used a device to check-in to the beacon, the beacon may be push the access credentials for the wireless network securely to the other users' devices. The secure access credentials may be configured to be wiped from the other users' devices after user, for example, when the other users' devices disconnect from the wireless network of the beacon.

20 Claims, 5 Drawing Sheets

SHARED NETWORK CONNECTION CREDENTIALS ON CHECK-IN AT A USER'S HOME LOCATION

TECHNICAL FIELD

The present application generally relates to shared network connection credentials on check-in at a user's home location and more specifically to sharing a WiFi or other Internet network's access credentials to guests when the guests check-in to a wireless beacon at the location of the network.

BACKGROUND

Users may set up router devices at locations that offer Internet access to user devices (e.g., laptop computers, mobile phones, tablet computers, etc.). For example, WiFi routers establish wireless networks around the router device, which enable a user to access the Internet using a WiFi compliant device. The wireless networks offered by these router devices often have speed advantages over cellular communication networks. Additionally, users may avoid data usage charges associated with user devices that utilize data transfer over the cellular communication networks. However, owners of these Internet routers often protect them from unauthorized usage to prevent illegal downloading or uploading, overuse or consumption of available bandwidth, etc. Thus, users who may visit a location must obtain access credentials in order to access the wireless network provided by the Internet router. This can be time consuming and exposes the owner offering the wireless network to potentially having their access credential provided to or stolen by an unauthorized third party.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various locations may provide short range wireless communications with a device, such as through Bluetooth Low Energy (BLE) beacon communications. These beacons may be set up at a location and communicate with the device to alert users of check-in services through their device. The beacons may provide additional functionality, such as establishing a connection with a server entity to complete transactions, including check-in services. The beacons may provide communication services to the devices directly, including information stored on the beacons. The beacons may also provide communication with a device attached to, or in communication with, the beacon, such as another device of another user corresponding to the location and/or an Internet router.

A user, such as an administrator of a network (e.g., an owner of a wireless Internet router), may offer check-in services to guest users at a location for the network. The network may correspond to a wireless network, such as a WiFi network provided by a WiFi router and utilized to access the Internet. In other embodiments, the network may correspond to a wired network accessible by connecting to an Internet router. The location may correspond to a home, office, campus, or other location where users may access the network. In order to offer check-in services, the user may utilize a short range wireless beacon at the location corresponding to the network to communicate with a device of a guest user. The short range wireless beacons may employ BLE communications that emit a signal receivable by the guest user's device. The communication may include an identifier for the beacon, the user, and/or a server effectuating the check-in (e.g., a service/payment provider). The guest user's device may be set up to passively monitor for BLE communications. When the guest user's device detects the signal and verifies the identifier, both the device and the beacon may ramp up in power and establish a connection, where the connection may further enable the guest user's device to communicate with another device and/or server effectuating check-in. The beacon may be connected to a networked device at the home location of the user, such as a computer, Internet router, etc., or the beacon may include network functionality to communicate with the device/server (e.g., over the wireless network or a cellular network). The beacon may also be connected to a user device of the user corresponding to the home location, either through short range wireless communication or a network connection (including a cellular network connection). Thus, the beacon enables the guest user's device to complete a check-in at the location for the network. The check-in may be completed automatically when the guest user's device is in range of the beacon, or may be completed after prompting the guest user to check-in when the guest user's device is in range of the beacon. The user may limit the range of the beacon to a distance near or within the location, such as a doorway/entryway, living room, meeting room, classroom, etc.

Once check-in information is received by the beacon, the beacon may determine whether the guest user is authorized to access the network at the location. In order to determine the authorization of the guest user, the beacon may utilize information available to the beacon, such as an authorized guest user list. An authorized guest list may be generated by the administrator of the beacon and/or network. For example, the administrator of the beacon and/or network may establish authorized guest users (e.g., by providing a name, phone number, identifier, etc.), or the guest user may establish authorization by previously providing information for the guest user, or providing the information on check-in with the beacon. Such information may be stored local to the beacon, or may be retrieved from a database accessible by the beacon (e.g., on the computer and/or Internet router of the user/administrator). The authorized guest user list may also come from a contact list of a party corresponding to the beacon/network (e.g., a user, administrator, etc.). The contact list may include phone numbers, email addresses, or identifiers that enable identification of the user device request accesses to the network. Moreover, the authorized guest user list may also be generated using trusted device of a user or administrator of the network. In such embodiments, if another user's device is co-located with the device of the user/administrator, or the other user engages in transactions using a name, phone number, email address, or other identifier with the user/administrator, the user and the user's device may be added to the authorized guest user list as a trusted user and/or device.

Additionally, the beacon may request authorization of the guest user from the user/administrator by alerting the user/administrator through the user's/administrator's device. The alert may be transmitted using short range wireless communications of the beacon if the device is in range of the beacon, or may be transmitted over a network connection, for example, if the user/administrator is not physically at the location of the network.

If the guest user is authorized to access the network, network access credentials for the network may be transmitted to the device for the guest user. Thus, the guest user may access the network using the credentials. The credentials may be transmitted as an encrypted token that is not viewable by the guest user or another device that may intercept the beacon. Additionally, if the guest user disconnects from the beacon, the token may be configured to be wiped from the guest user's device so that the guest user can no longer access the network. The beacon may also revoke the credentials if the guest user's device disconnects from the router providing the network connection. Moreover, even if the guest user is authorized to use the network, the user/administrator may be alerted that the guest user has accessed the network and revoke the credentials. For example, the user/administrator may not be at the location for the wireless network (e.g., at home/work). Thus, if the guest user is a neighbor or employee of a nearby office and is attempting to access the wireless network, the user/administrator may revoke the credentials from the guest user's device.

Figure 1:
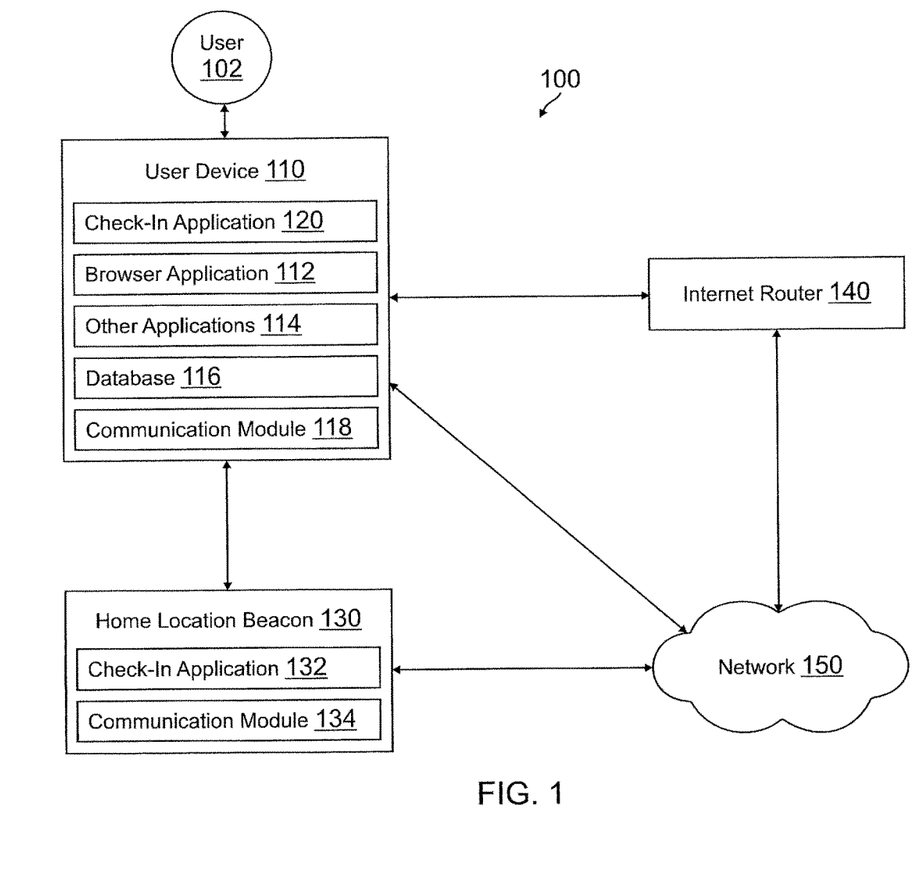
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a home location beacon 130, an Internet router 140, and a network 150. User 102, such as a guest user at a location having a wired and/or wireless network, may utilize user device 110 to check-in to the location through home location beacon 130. Check-in may further be processed using a service provider server (e.g., a server of a payment provider). Thus, home location beacon 130 may be located at a home, office, or other place having a network established by Internet router 140. Once check-in information is transmitted by user device 110 to home location beacon 130, home location beacon 130 may determine if user 102 is authorized to utilize the network provided by Internet router 140. If the user is authorized to access the network, home location beacon 130 may push network access credentials of the network to user device 110, which later may be removed and/or revoked from user device 110.

User device 110, home location beacon 130, and Internet router 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with home location beacon 130 and/or Internet router 140. For example, in one embodiment, user device 110 may be implemented as a personal computer (PC), a smart phone, laptop computer, wristwatch with appropriate computer hardware resources, eyeglasses with appropriate computer hardware (e.g. GOGGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 120, a browser application 112, other applications 114, a database 116, and a communication module 118. Check-in application 120, browser application 112, and other applications 114 may correspond to processes, procedures, and/or applications executable by a hardware processor, for example, a software program. In other embodiments, user device 110 may include additional or different software as required.

Check-in application 120 may be used by user 102 of user device 110 to transmit check-in information for processing a check-in for user 102. Check-in application 120 may correspond to a specific application utilized by user device 110, with home location beacon 130 and/or a user device or server in communication with home location beacon 130, to complete a check-in for a location corresponding to home location beacon 130. The check-in may correspond to a process to log in to a user account of user 102 (e.g., a user account with a wireless network provided by Internet router 140 and/or a user account provided by a payment/service provider). In other embodiments, the check-in may provide and/or verify the identity of user 102, including transmission of an identifier for user 102 and/or user device 110. The check-in may be completed over network 150. In such embodiments, check-in application 120 may correspond more generally to a browser application configured to communicate with the entity providing the user account.

Check-in application 120 may also receive short range wireless communications from home location beacon 130 at a location corresponding to home location beacon 130 and complete a check-in that associates user 102 with the location corresponding to home location beacon 130. For example, the location may correspond to a location for another user or administrator of a wireless network offered by Internet router 140 (e.g., a home, office, business, campus, etc. location) where home location beacon 130 is set up to communicate with user device 110 when user device 110 is in proximity to the home location and can access the wireless network. In such examples, home location beacon 130 may be set up at an entryway, door, meeting room, classroom, or other area of the location that provides communications with user device 110 when user device 110 is within range of home location beacon 130. Thus, check-in application 120 may transmit check-in information for use in processing the check-in through home location beacon 130 when user 102 is at the location, thereby associating user 102 with the location.

Check-in application 120 may execute in the background of an operating system of user device 110 and be configured to establish connections, using communication module 118 of user device 110, with home location beacon 130 at a location corresponding to a network provided by Internet router 140. The connection may be established with or without user input from user 102. For example, home location beacon 130 may broadcast a token, such as a universally unique identifier (UUID), for reception by check-in application 120, as will be explained in more detail herein. Check-in application 120 may utilize communication module 118 of user device 110 to receive the token from home location beacon 130. If check-in application 120 acknowledges the UUID as identifying home location beacon 130, Internet router 140, a network corresponding to Internet router 140, and/or a payment/service provided (e.g., if check-in application 120 determines the UUID corresponds to a request to complete a check-in for a server offering check-in services), check-in application 120 may transmit an identifier corresponding to user 102 and/or user device 110 back to home location beacon 130. Check-in application 120 may utilize communication module 118 of user device 110 to communicate with home location beacon 130 (e.g., over near field communication, Bluetooth, Bluetooth Low Energy, radio, infrared, or other connection). The identifier from user device 110 may include, be transmitted with, concatenated with, or otherwise bundled with the identifier received from home location beacon 130.

Once a connection is established with home location beacon 130, user device 110 may be checked-in if user 102 has not previously been checked-in. The check-in process may then associate user 102 with home location beacon 130 used to check-in user 102. For example, a user/administrator for a wireless network provided by Internet router 140 may previously register home location beacon 130 as corresponding to the wireless network for Internet router 140 (e.g., at a home, office, campus, etc.). Thus, a user device and/or server in communication with home location beacon 130 may be informed that user 102 is in proximity to the location because user 102 checked-in to home location beacon 130 using user device 110. If home location beacon 130 corresponds generally to the home location for another user that owns and manages Internet router 140, user 102 may be associated with the home location. In other embodiments, home location beacon 130 may be established at a workplace, business, or other location associated with a user, employer/employee, business acquaintance, school, or other administrator of the wireless network provided by Internet router 140.

Check-in application 120 may also transmit and/or receive information. For example, check-in application 120 may receive information for Internet router 140, including network access credentials for Internet router 104 and/or a network provided by Internet router 140. The information may assist user device 110 in accessing the network. The network access credentials may be transmitted as a data token, which may be removed, erased, or revoked when user device 110 disconnects for one or more of home location beacon 130 and/or the network. User device 110 may utilize communication module 118 to receive the aforementioned information for display to user 102 in an application interface of check-in application 120. However, in other embodiments, the network access credentials may be hidden, encrypted, or otherwise invisible to user 102 so that user 102 may not be informed of the network access credentials.

Once check-in application 120 has received network access credentials for a network provided by Internet router 140, check-in application 120 may access the network provided by Internet router 140 and configure user device 110 to utilize the network provided by Internet router 140 for data transfers. Thus, check-in application 120 may be configured to enter the network access credentials to a network access request by Internet router 140 and/or the wireless network provided by Internet router 140. Check-in application 120 may also provide a user interface that permits user 102 to view available networks, access networks for which check-in application 120 possesses network access credentials, and disconnect from one or more of the networks. Check-in application 120 may provide user 102 with information for the networks, such as a name, owner/administrator of the network, amount and type of data transferred over one or more of the networks, and/or data security (e.g., privacy information) for user device 110 and data stored on user device 110.

Check-in application 120 may utilize communication module 118 to pass information to home location beacon 130, Internet router 140, and/or a payment/service provider offering check-in and user account services. For example, information transmitted by check-in application 120 may include identifiers for user 102, authorization information (e.g., an authorization token, digital certificate, security key, etc.) that permits user 102 to access a network provided by Internet router 140, or other information used by home location beacon 130 determine if user 102 should receive network access credentials for the network. Check-in application 120 may also provide a user device and/or server in communication with home location beacon 130 with information for user 102 and/or user device 110, including identifiers, user/financial accounts with payment/service provider, transaction information, transaction histories between user 102, and/or other information. Additionally, browser application 112 may also pass information to home location beacon 130, Internet router 140, and/or a user device or server in communication with home location beacon 130.

Browser application 112 may be used, for example, to provide a convenient interface to permit user 102 to browse the Internet, including navigation to websites and between webpages of websites. Browser application 112 may therefore be configured to transmit and receive information, such as webpage requests, input to webpages, downloads and uploads of data in database 116 of user device 110, etc. Thus, when user device 110 is connected to a network, browser application 112 may utilize network bandwidth to communicate data over the network. Where the network is a cellular communication network, data transfers by browser application 112 may require a data plan, which may include a limit on the amount of data transferable over a period of time by user device 110. Thus, user 102 may wish to utilize a WiFi or other wired/wireless network provided by Internet router 140 to access and transfer data over the Internet to avoid usage of the data plan and potentially increase data transfer speeds. As previously discussed, user 102 may therefore utilize check-in application 120 to request network access credentials and input the network access credentials to an access request for the WiFi or other network.

Browser application 112 may be utilized to establish an authorization to utilize a network provided by Internet router 140. Thus, prior to or while submitting check-in information to home location beacon 130, user 102 may utilize browser application 112 to authorize user device 110 to utilize the network provided by Internet router 140. In order to authorize user device 110, user 102 may log in to a user account of user 102 and request authorization from an administrator of the network. User 102 may also submit a user, device, or other identifier to the administrator using browser application 112. The identifier may be submitted through a website for the administrator, or may be communicated to the administrator through an email, web message, SMS/MMS message, etc. The authorization may be requested prior to user 102 arriving at the location having the network (e.g., before traveling to an office or school/business campus) or may be requested when user 102 arrives at the location and requests to access the network.

User 102 may be required to pay for access to the network. Thus, browser application 112 may be implemented as an application having a user interface enabling user 102 to enter payment information and request payment for a payment amount to access the network on checkout/payment for use of the network. In certain embodiments, browser application 112 may utilize a payment provider server, such as one provided by PAYPAL® of San Jose, Calif. Browser application 112 may also include or correspond to a dedicated payment application, including one offered by PAYPAL®. In such embodiments, the payment application may also be configured to show available networks that user 102 may access through payment for use of the network.

In various embodiments, check-in application 120 and/or browser application 112 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications associated with a payment provider server. Other applications 114 may include mapping or other applications that show a range and/or location of a wired or wireless network provided by Internet router 140. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 120, browser application 112, and/or other applications 114, identifiers associated with hardware of user device 110, or other appropriate identifiers, such as identifiers used for payment/user/device authentication or identification. Identifiers in database 116 may be used by a payment/service provider to associate user device 110 with a particular account maintained by the payment/service provider. Identifiers in database 116 may be used by check-in application 120 to identify user 102 and/or user device 110 during check-in with home location beacon 130. Database 116 may include user device tokens and/or encryption keys, including an encryption key of home location beacon 130, Internet router 140, and/or a network provided by Internet router 140. Database 116 may include identifying information for tokens enabling check-in application 120 to identify home location beacon 130, Internet router 140, and/or a network provided by Internet router 140 when receiving a corresponding token. Information in database 116 may be utilized to authorize user 102 to access a wireless network provided by Internet router 140. Thus, database 116 may include identification information for user 102, including a name, address, and/or image of user 102.

User device 110 includes at least one communication module 118 adapted to communicate with home location beacon 130, Internet router 140, and/or network 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with home location beacon 130 using short range communications, such as radio frequency, infrared, Bluetooth, and near field communications.

Home location beacon 130 may be maintained, for example, by a user/administrator for Internet router 140. Home location beacon 130 may be implemented using any appropriate hardware and software configured for wireless communication with user device 110. For example, in one embodiment, home location beacon 130 may be implemented as a dongle device including a hardware processor and a communication module, for example, connected to device at the location for a network provided by Internet router 140. Home location beacon 130 may also be implemented as a device incorporated within a personal computer (PC), a smart phone, a wearable computing device, laptop computer, and/or other types of computing devices capable of transmitting and/or receiving data, such as an IPAD® from APPLE®. Home location beacon 130 may also act as a stand-alone device including a processor, communication module, and/or network interface component configured to communicate with user device 110 and/or Internet router 140. Although a single beacon is described, a plurality of wireless beacons may be utilized and be location specific within the location for the network provided by Internet router 140, as previous discussed Home location beacon 130 may be located at a physical location corresponding to Internet router 140. For example, a physical location corresponding to Internet router 140 may constitute a home location, a work location, an office, a school or business campus, a storefront or other merchant location, or other location associated with Internet router 140. The location may correspond to an area covered by a wireless network provided by Internet router 140. Home location beacon 130 of FIG. 1 contains processes, procedures, and/or applications executable by a hardware processor, for example, a software program, configured to interact with user device 110, Internet router 140, and/or a payment/service provider or administrator of Internet router 140 offering check-in services through a server to user 102. Thus, regardless of the implementation of home location beacon 130, as discussed above, home location beacon 130 utilizes a check-in application 132 and a communication module 134. In other embodiments, home location beacon 130 may include additional or different software and devices as required.

Check-in application 132 may correspond to an application for transmitting requests to establish a connection between a device (e.g., user device 110) and home location beacon 130. Thus, home location beacon 130 may utilize short range wireless communications of home location beacon 130 to transmit requests to establish a connection, including an identifier such as a Universally Unique Identifier (UUID), as previously discussed. If user device 110 receives a request to establish the connection with home location beacon 130 and responds with a user device identifier (potentially including the UUID and other information to effectuate a check-in of user device 110), check-in application 132 may cause home location beacon 130 to ramp up in power and create a connection between user device 110 and home location beacon 130.

Home location beacon 130 may transmit the request to establish the connection with home location beacon 130 as a short range wireless communication (e.g. a BLE protocol communication) including a "wake up" process for check-in application 120 of user device 110 and/or a token for home location beacon 130. The request may be specific to user device 110 by including information that is specific to user 102, such as a name, identifier, or user device identifier. The information specific to user 102 may be determined from a user account of user 102 or other information previously provided to home location beacon 130 and/or Internet router 140. Thus, in certain embodiments, only user device 110 will pick up and authenticate the request.

In other embodiments, the request and/or connection may utilize near field communication, radio communication, infrared communication, or Bluetooth communication. Additionally, although home location beacon 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to home location beacon 130 (e.g., user device 110) and establishment of a connection for data transfers.

After check-in application 132 receives an identifier for user 102 from user device 110, check-in application 132 may determine user 102 is in proximity to home location beacon 130. Home location beacon 130 may pass the user identifier to Internet router 140, a payment/service provider server, and/or other device/server for a user/administrator of Internet router 140 to process and complete the check-in process. As shown in FIG. 1, home location beacon 130 may utilize communication module 134 to pass the identifier over network 150 to an entity to Complete check-in. However, in other embodiments, home location beacon 130 may utilize short range wireless communications with a device or server nearby home location beacon 130 to transmit the check-in information. Additionally, check-in application 132 may cause home location beacon 130 to keep a communication channel open between user device 110 and home location beacon 130 for passing additional information, such as network access credentials for Internet router 140.

After check-in information is received from user device 110, check-in application 132 may determine if user device 110 is authorized to access Internet router 140 and/or a wireless network provided by Internet router 140. As previously discussed, user 102 may receive authorization from a user/administrator owning or managing Internet router 140 and the corresponding network. For example, a homeowner may purchase Internet router 140 to provide a WiFi network within a home for Internet router 140. Likewise, a school may purchase one or more Internet router(s) 140 and place them around a campus for the school in order to provide a WiFi network to students of the school. Thus, home location beacon 130 is established at the location for the network and provides communications and check-in services to user device 110. Once the check-in information is received by home location beacon 130, check-in application 132 may utilize a database accessible by home location beacon 130 (e.g., contained within home location beacon 130 or accessible over a network connection) to determine if user device 110 is authorized to utilize the network. In other embodiments, check-in application 132 may alert another user or administrator of the received check-in information and submit an authorization request on behalf of user 102 to the user/administrator. Thus, the user/administrator may be required to instruct home location beacon 130 to authorize user device 110 and transmit the network access credentials to user device 110.

If user device 110 is authorized to access the network, check-in application 132 may transmit the network access credentials to user device 110 enabling user device 110 to access a network provided by Internet router 140. As previously discussed, the network access credentials may be encrypted, hidden, or otherwise obfuscated so that user 102 is unaware of the credentials but they still allow access to the network. The credentials may comprise a security key or password enabling access to the network. Moreover, the token or information passed to user device 110 may be set up to be wiped, removed, or revoked as soon as user device 110 disconnects from one or more of home location beacon 130, Internet router 140, and/or a wireless network provided by Internet router 140.

Home location beacon 130 may alert a user/administrator for Internet router 140 that home location beacon 130 received check-in information and user 102 is utilizing a network provided by Internet router 140. The user/administrator may utilize another user device to revoke the network access credentials from user device 110 if the user/administrator determines user 102 is unauthorized or overusing the network. Additionally, home location beacon 130 may revoke the network access credentials from user device 110 if the user device of the other user disconnects from home location beacon 130, a network provided by Internet router 140, or is located away from the location corresponding to Internet router 140. For example, a user may be purchasing goods 5 miles away from home while user 102 is attempting to access the network. In another embodiment, the user owning Internet router 140 may leave their home location, thus disconnecting from home location beacon 130 and/or the network provided by Internet router 140. This may force all other guest devices connected to the network to disconnect and have the network access credentials revoked. Thus, home location beacon 130 may determine user 102 should not be utilizing the network without the user/administrator at home, and revoke the network access credentials.

In various embodiments, home location beacon 130 includes at least one communication module 134 adapted to communicate with user device 110, Internet router 140, and network 150. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate with user device 110 and/or Internet router 140 using short range communications, such as radio frequency, infrared, Bluetooth, and near field communications.

Internet router 140 corresponding to a device enabling transfer of data information over the Internet. In various embodiments, communication module 148 may include a DSL (e.g., Digital Subscriber Line) modem, a PSTN (Public Switched Telephone Network) modem, an Ethernet device, a WiFi device, a broadband device, a satellite device and/or various other types of wired and/or wireless network communication devices. Internet router 140 may provide a network utilized to communicate with other computer networks, including the Internet. Internet router 140 may provide a wired and/or a wireless network, such as a WiFi network. Internet router 140 may be located at a home, office, school/business campus, merchant location, etc. Internet router 140 may be password and/or key protected and users may be required to pay for use of, or amount of data transmitted over, the network. Internet router 140 may communicate directly with home location beacon 130 using short range communications, such as BLE, radio frequency, infrared, Bluetooth, and near field communications or over network 150.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

As previously discussed, in embodiment where user 102 is required to pay for access to Internet router 140 and/or a wireless network provided by Internet router 140, FIG. 1 may further include a payment provider server (not shown). The payment/service provider server may be maintained, for example, by an online payment service provider, which may provide payment services and/or processing for financial transactions on behalf of a user. In this regard, the payment/service provider server includes one or more processing applications which may be configured to interact with user device 110, home location beacon 130, and/or Internet router 140 to facilitate payment for a transaction. In one example, the payment/service provider server may be provided by PAYPAL®, Inc. of San Jose, Calif., USA. However, in other embodiments, the payment/service provider server may be maintained by or include a credit provider, financial services provider, financial data provider, and/or other service provider, which may provide payment services to user 102.

In certain embodiments, the payment/service provider may provide check-in services to user 102. The check-in service may correspond to processes to complete check-in with user device 110 for a location corresponding to a wireless network provided by Internet router 140. Thus, the check-in service may correspond to the server side application configured to receive a check-in request from user device 110 and complete the check-in request. The check-in request may include log in information for a user account and thus complete the check-in with user 102 by verifying the account information. However, in embodiments where a user account has not been previously established by user 102, the check-in service may receive other information identifying user 102, including a user name/identifier, user device identifier, or other information.

Figure 2:
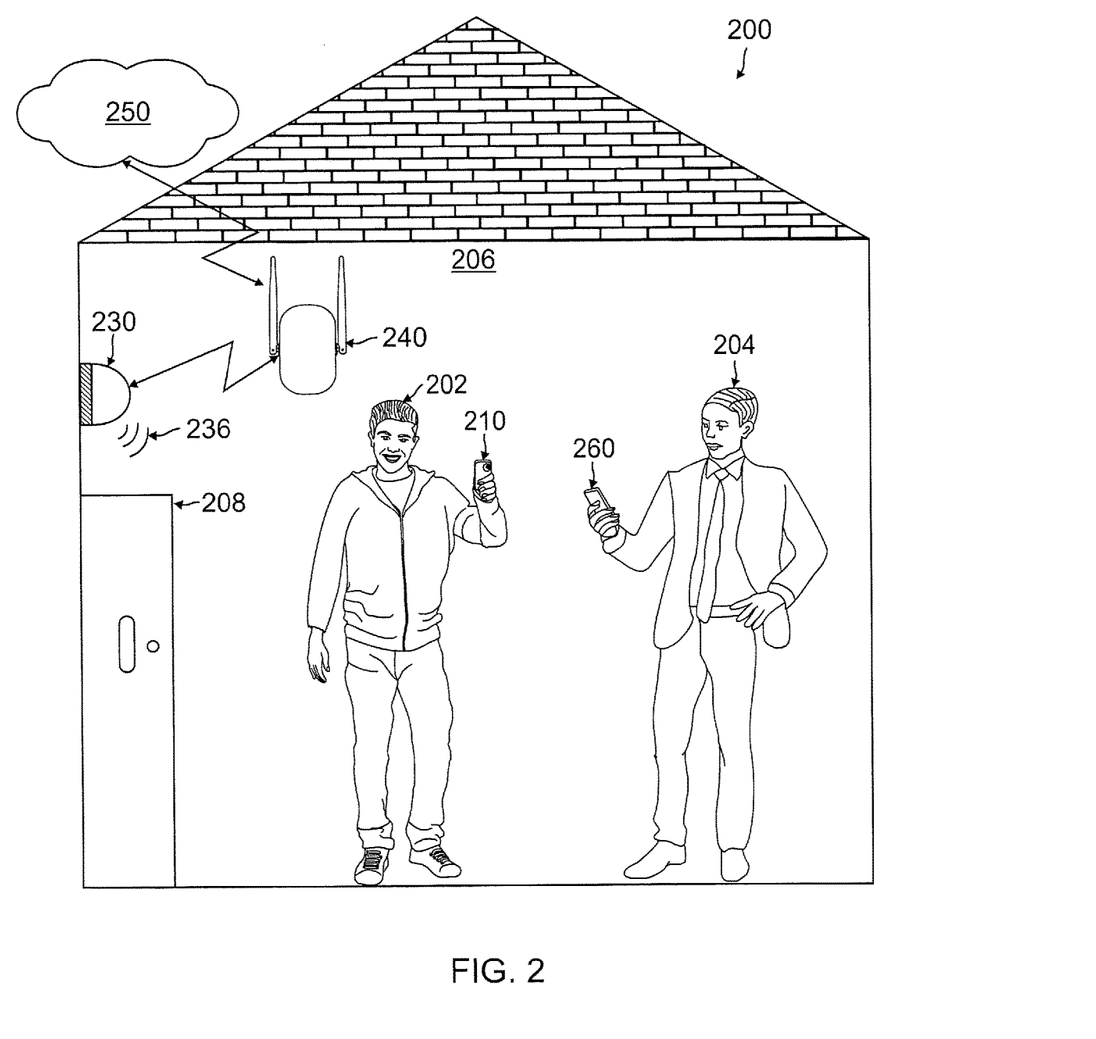
FIG. 2 is an exemplary system environment displaying a guest user receiving network access credentials to a WiFi router at a home of a user through a wireless beacon, according to an embodiment.

FIG. 2 is an exemplary system environment displaying a guest user receiving network access credentials to a WiFi router at a home of a user through a wireless beacon, according to an embodiment. Environment 200 of FIG. 2 includes a user 202 corresponding generally to user 102 of FIG. 1. Additionally, user 202 possesses a user device 210 corresponding generally to user device 110 of FIG. 1. Environment 200 further includes a home location beacon 230, an Internet router 240, and a network 250 each corresponding generally to home location beacon 130, Internet router 140, and network 150, respectively, of FIG. 1.

As shown in FIG. 2, user 202 arrives at a home 206 for a user 204. Home 206 may correspond to a residence for user 204, however, in other embodiments, home 206 may instead be an office, business, campus, a specific room within a building, home, hotel, etc. User 204 may establish home location beacon 230 and Internet router 240 at home 206. As previously discussed, home location beacon 230 may provide check-in services for user 202 through user device 210. Thus, as user 202 enters home 206 through entryway 208, user device 210 and home location beacon 230 may pair and begin communicating. For example, home location beacon 230 may transmit a check-in request 236 that may begin a check-in process with user device 210. As part of the communications, user device 210 may transmit check-in information including an identifier or other identification information for user 202 and/or user device 210 to home location beacon 230. The check-in information may be utilized to process and complete a check-in for user 202 with home 206.

Additionally, information in the check-in information may be utilized to determine if user device 210 is authorized to access a network provided by Internet router 240. For example, an identifier in the check-in information may be compared to known identifiers in a database to determine if user 202 and/or user device 210 is authorized to receive network access credentials for Internet router 240. In other embodiments, the check-in information may be forwarded to a user device 260 held by user 204. User device 260 may correspond to a user device having similar hardware and/or software to user device 110/210, which may be utilized to authorize user device 210 to receive network access credentials for Internet router 240. Thus, user 204 may view user device 260 and see that user 202 is requesting to access the network provided by Internet router 240 through user device 210. User 204 may then affirm or deny the request.

If user 202 is authorized to access a network provided by Internet router 240, home location beacon may push network access credentials for the network to user device 210. Once network access credentials are pushed to user device 210, user 202 may begin using the network with user device 210. During use of the network, user 204 may receive updates on user device 260. Updates may correspond to an alert that user device 210 is attempting to access the network, an amount of data user 202 is requesting to transmit over the network, a type of data in an upload and/or download, etc. User 204 may also revoke the network access credentials from user device 210, for example, if user 202 is using the network without user 204's permission, is using too much bandwidth of the network, or is illegally uploading/downloading content.

Once network access credentials for a network provided by Internet router 240 are pushed to user device 210, the network access credentials may be removed from user device 210. In certain embodiments, this may include removal without an interaction by user 204. For example, user 202 may disconnect from the network using user device 210. Thus, the network access credentials may be removed if user 202 no longer requires access to the network. In other embodiments, if user 202 brings user device 210 out of a range covered by home location beacon 230, and thus disconnects from home location beacon 230, the network access credentials may be removed from user device 210.

Figure 3:
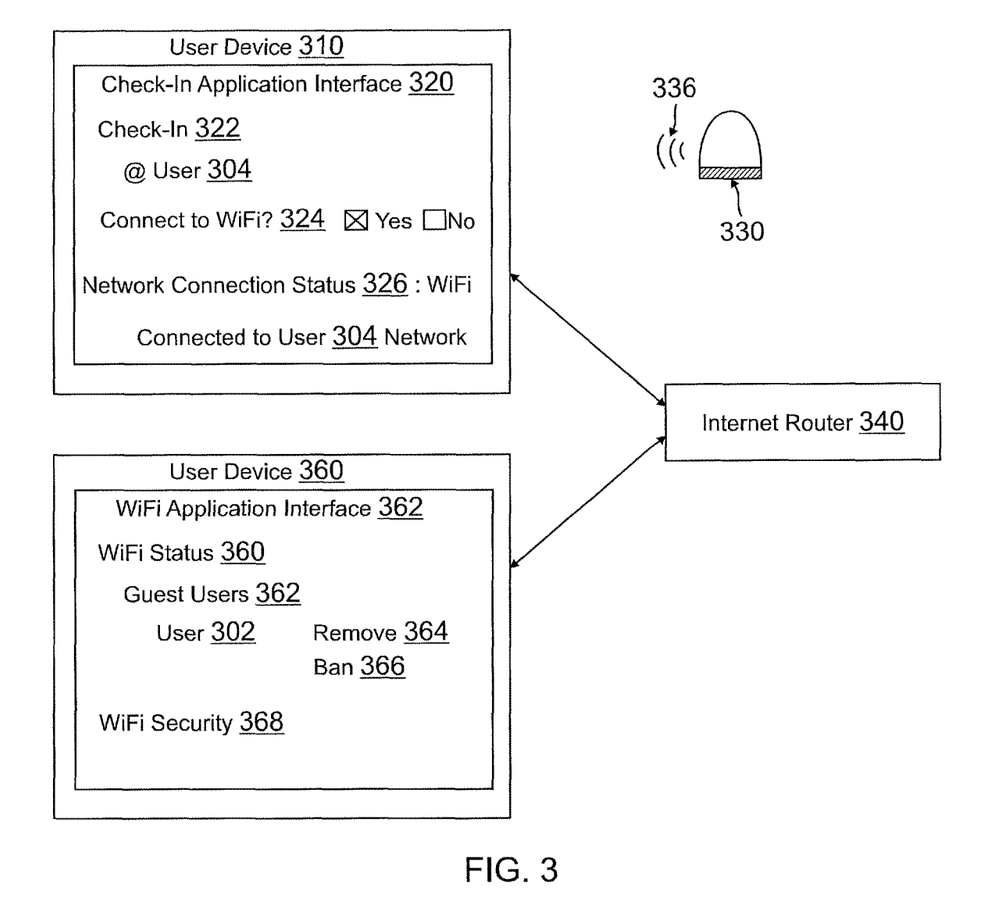
FIG. 3 is an exemplary system environment showing display screens for devices of a user/administrator and a guest when transmitting network access credentials to the guest's device, according to an embodiment.

FIG. 3 is an exemplary system environment showing display screens for devices of a user/administrator and a guest when transmitting network access credentials to the guest's device, according to an embodiment. FIG. 3 includes a user device 310, a home location beacon 330, and an Internet router 340 corresponding generally to user device 110, home location beacon 130, and Internet router 140, respectively, of FIG. 1. Additionally, FIG. 3 includes a user device 360 corresponding generally to user device 260 of FIG. 2.

User device 310 displays a check-in application interface 320 corresponding generally to the executed processes and features of check-in application 120 of FIG. 1. Check-in application interface 320 enables a user (not shown) of user device 310 to view and process a check-in request from home location beacon 330 and receive network access credentials. Thus, home location beacon 330 transmits a check-in request 336 to user device 310. Check-in request 336 may include an identifier enabling user device 310 to determine that home location beacon 330 can process and complete a check-in for user device 310. Thus, after receiving check-in request 336, check-in application interface 320 displays a check-in 322 showing that user device 310 is checked-in "at user 304." Home location beacon 330 may belong to another user (e.g., user 304, not shown), and be established at a location (e.g., a home, office, campus, etc.) where the other user has set up a network using Internet router 340. Once the check-in information for user device 310 is sent to home location beacon 330, check-in application interface 320 may display an option to connect to Internet router 340.

Connect to WiFi 324 option shows that the user of user device 310 has requested network access credentials for Internet router 340. If user device 310 (or the user of user device 310) is authorized to access the network, user device 310 may receive network access credentials from home location beacon 330. Once received, check-in application interface 320 displays a network connection status 326 showing the network connected to by user device 310. Thus, user device 310 is "connected to user 304 network."

In addition to transmitting network access credentials to user device 310, home location beacon 330 and/or Internet router 340 may communicate a status and update to user device 360. The status/update may inform the user of user device 360 (e.g., the owner/administrator of the network provided by Internet router 340, user 304, not shown) that user device 310 has requested the network access credentials, when user device 310 accesses the network, and behavior of user device 310 while connected to the network. Therefore, user device 360 displays a WiFi application interface 362 having a WiFi status 360 and WiFi security 368. WiFi status 360 may display guest users 362 who have connected to the network provided by Internet router 340. Guest users include the user of user device 310 (e.g., user 302, not shown). Selecting user 302 under guest users 362 may bring up additional information for the guest user, such as a name, identifier, image, device information, upload/download information, bandwidth usage, etc. Additionally, the user of user device 360 may select to remove 364 the guest user and/or ban 366 the guest user from re-accessing the network. WiFi application interface 362 enables the user of user device 310 to access WiFi security 368, such as changing a password/security key to access the network provided by Internet router 340.

Figure 4:
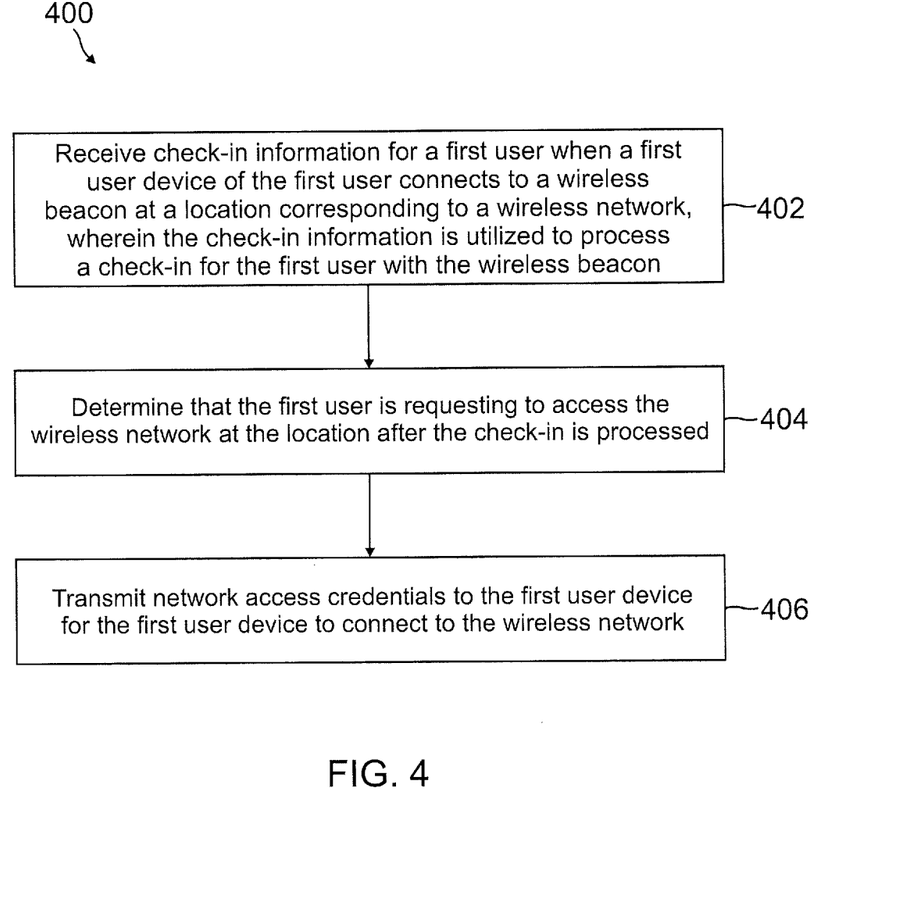
FIG. 4 is a flowchart of an exemplary process by a server for shared network connection credentials on check-in at a user's home location, according to an embodiment.

FIG. 4 is a flowchart of an exemplary process by a server for shared network connection credentials on check-in at a user's home location, according to an embodiment. Note that one or more steps, processes, and methods described herein may be omitted, performed in a different sequence, or combined as desired or appropriate.

At step 402, check-in information for a first user is received when a first user device of the first user connects to a wireless beacon at the location corresponding to a wireless network, wherein the check-in information is utilized to process a check-in for the first user with the wireless beacon. The connection between the first user device and the wireless beacon may be a first wireless connection. The wireless network may correspond to a wireless Internet network, such as a WiFi network for Internet access. In other embodiments, the wireless beacon may be located near an Internet router the first user may utilize to access a wired network, including a wired Internet network. The first user device and the wireless beacon may connect using one of near field communication, radio communication, infrared communication, Bluetooth communication, and Bluetooth low energy communication. The wireless beacon may be ranged limited to connect to the first user device within a set distance at the location, and a second user/administrator for the wireless beacon may set the range.

Note that even though the wireless network may be accessible over a relatively wide range, such as throughout a hotel or house, guess access to the network may be limited to specific areas or rooms of the home location. For example, beacons may be placed in specific areas or rooms, such that only those areas may receive the guest access check-in. Even within an area or room, access may be limited to specific users (such as a hotel guest that is a loyal guest or has paid for service or only within a family or work room as opposed to a private area such as a bathroom in order to more easily monitor what is being accessed by guests. The guest users (e.g., the first user) may also be limited to an amount of time to utilize the wireless network (e.g., 1 hour, 1 day, etc.) or may be limited to an amount of data transferable over the wireless network (e.g., a bandwidth cap). The limits may be specific to a particular guest user or may be general to all guest users. In other embodiments, different limits may be imposed on usage of the wireless network by the first user, including subscription based limits, security and firewall limits, etc.

At step 404, it is determined that the first user is requesting to access the wireless network at the location after the check-in is processed. Thus, the first user may be requesting a second wireless connection with the wireless network. In other embodiments, a request to access the wireless Internet network at the location may be received and/or processed from the first user device. The network access credentials are transmitted to the first user device for the first user device to connect to the wireless network, at step 406. The network access credentials may be removed from the first user device when the first user device disconnects from the wireless beacon.

The network access credentials may be transmitted to the first user device using one or more data security protocols. The wireless network may be accessed through a WiFi router at the location, and the network access credentials may comprise a security key or password to access the wireless network provided by the WiFi router at the location. The wireless beacon may revoke the network access credentials from the first user device when the first user device disconnects from the Internet router. Additionally, the wireless beacon may determine a second user corresponding to the wireless network is not at the location and revoke the network access credentials from the first user device.

In certain embodiments, the wireless beacon may alert a second user corresponding to the wireless network of the check-in for the first user using a second user device, wherein the second user is authorized to revoke the network access credentials using the second user device. The second user may be alerted of a cellular network if the second user is not at the location. Additionally, it may be determined that the second user is not at the location by determining a second user device of the second user has disconnected from one or more of the wireless beacon and the wireless Internet network. Thus, the wireless beacon may revoke the network access credentials from the first user device on instruction from a second user corresponding to the wireless Internet network. In other embodiments, before transmitting the network access credentials to the first user device, the wireless beacon may alert a second user corresponding to the wireless Internet network that the first user is requesting to access the wireless Internet network and receive an instruction to transmit the network access credentials from the second user.

Figure 5:
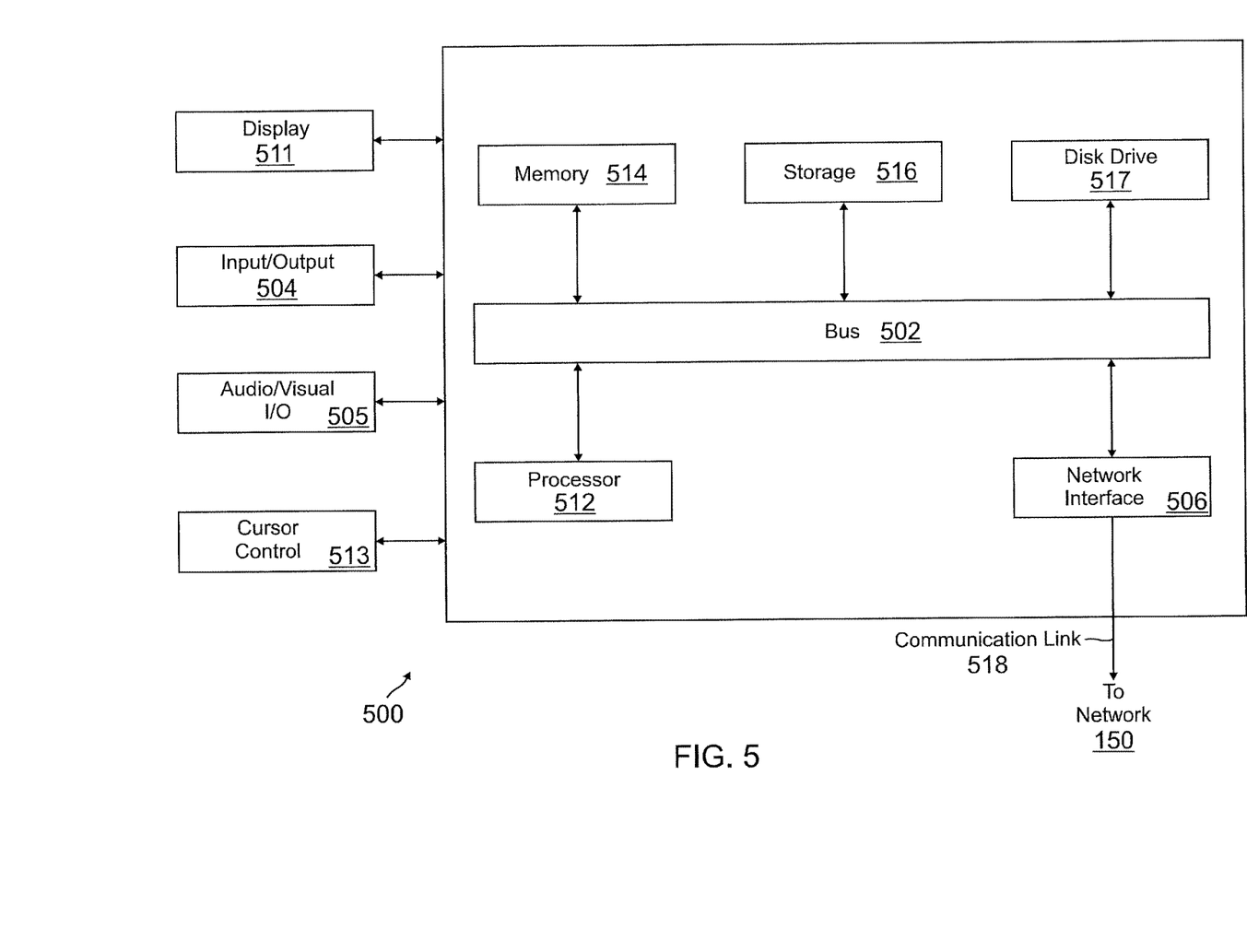
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, wearable computing device, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A network access system comprising:
a non-transitory memory storing network access credentials for a wireless network provided at a location by a wireless router separate from a wireless beacon device at the location; and
one or more hardware processors coupled to the non-transitory memory and configured to execute instructions to cause the network access system to perform operations comprising:
causing to be broadcast, by the network access system over a network connection with the wireless beacon device, one or more requests for check-in by the wireless beacon device using a short range wireless communication protocol at the location, wherein the one or more requests for check-in are separate from the wireless network provided by the wireless router, and wherein the wireless beacon device connects to a first user device at the location over a short range wireless communication channel separate from the wireless network using the short range wireless communication protocol;
receiving, by the network access system over the network connection with the wireless beacon device, an identifier transmitted from the first user device to the wireless beacon device via the short range wireless communication channel;
determining that the first user device is requesting a wireless connection to the wireless network through the wireless router; and
in response to determining, based on the identifier, that the first user device is authenticated to access the wireless network using a second user device for a second user that administers the wireless network, causing authorization of the first user device to access the wireless network through the wireless router.

2. The network access system of claim 1, wherein the short range wireless communication protocol comprises one of near field communication, radio communication, infrared communication, Bluetooth communication, Bluetooth low energy communication, LTE Direct communication, or WiFi communication.

3. The network access system of claim 1, wherein the operations further comprise:
causing the wireless beacon device to transmit the network access credentials to the first user device to access the wireless network through the wireless router, wherein the network access credentials are transmitted to the first user device using one or more data security protocols.

4. The network access system of claim 3, wherein the wireless router comprises a WiFi router at the location, and wherein the network access credentials comprise a security key or password to access the wireless network provided by the WiFi router at the location.

5. The network access system of claim 3, wherein the operations further comprise:
revoking the network access credentials from the first user device when the first user device is disconnected from the wireless connection.

6. The network access system of claim 3, wherein the operations further comprise:
determining the second user corresponding to the wireless network is not at the location; and
revoking the network access credentials from the first user device responsive to determining that the second user is not at the location.

7. The network access system of claim 3, wherein the operations further comprise:
alerting the second user corresponding to the wireless network of a check-in for the first user device using the second user device, wherein the second user is authorized to revoke the network access credentials using the second user device using the second user device.

8. A method comprising:
causing to be broadcast, by a remote server system over a network connection with a wireless beacon device, one or more requests for check-in by the wireless beacon device using a short range wireless communication protocol at a location, wherein the one or more requests for check-in are separate from a wireless Internet network provided by a wireless router, and wherein the wireless beacon device connects to a first user device at the location over a short range wireless communication channel separate from the wireless Internet network using the short range wireless communication protocol;
receiving, by the remote server system over the network connection with the wireless beacon device, an identifier transmitted from the first user device to the wireless beacon device via the short range wireless communication channel;
processing, using one or more hardware processors, a request from the first user device for a wireless connection to the wireless Internet network through the wireless router;
determining that the first user device is authenticated to access the wireless Internet network using the identifier and a second user device for a second user that administers the wireless Internet network; and
in response to determining, based on the identifier, that the first user device is authenticated to access the wireless Internet network, causing authorization of the first user device to access the wireless Internet network through the wireless router.

9. The method of claim 8, further comprising:
causing the wireless beacon device to transmit network access credentials to the first user device to access the wireless Internet network through the wireless router, wherein the network access credentials are transmitted to the first user device using one or more data security protocols; and
removing the network access credentials from the first user device when communication via the short range wireless communication channel between the first user device and the wireless beacon device ends.

10. The method of claim 8, further comprising:
causing the wireless beacon device to transmit network access credentials to the first user device to access the wireless network through the wireless router, wherein the network access credentials are transmitted to the first user device using one or more data security protocols; and
revoking the network access credentials from the first user device on instruction from the second user corresponding to the wireless Internet network.

11. The method of claim 8, further comprising:
causing the wireless beacon device to transmit network access credentials to the first user device to access the wireless network through the wireless router, wherein the network access credentials are transmitted to the first user device using one or more data security protocols;
determining the second user corresponding to the wireless Internet network is not at the location; and
revoking the network access credentials from the first user device responsive to determining that the second user is not at the location.

12. The method of claim 11, wherein the determining the second user is not at the location comprises determining the second user device of the second user has been disconnected from one or more of the wireless beacon device or the wireless Internet network.

13. The method of claim 8, wherein causing the authorization of the first user device comprises:
alerting the second user corresponding to the wireless Internet network that the first user is requesting to access the wireless Internet network;
receiving an instruction to transmit network access credentials from the second user; and
causing the wireless beacon device to transmit the network access credentials to the first user device for the first user device to access the wireless network through the wireless router, wherein the network access credentials are transmitted to the first user device using one or more data security protocols.

14. The method of claim 8, further comprising:
causing the wireless beacon device to transmit network access credentials to the first user device for the first user device to access the wireless network through the wireless router, wherein the network access credentials are transmitted to the first user device using one or more data security protocols;
receiving one or more limits on a usage of the wireless Internet network by the first user device; and
removing the network access credentials from the first user device when the first user device exceeds the one or more limits.

15. A non-transitory machine-readable medium having stored thereon machine-readable instructions executable to cause a machine to perform operations comprising:
causing to be broadcast, by a remote network authentication server over a network connection with a wireless beacon device, one or more requests for check-in by the wireless beacon device using a short range wireless communication protocol at a location, wherein the one or more requests for check-in are separate from a network provided by a wireless router, and wherein the wireless beacon device connects to a first user device at the location over a short range wireless communication channel separate from the network using the short range wireless communication protocol;
receiving, by the remote network authentication server over the network connection with the wireless beacon device, an identifier transmitted from the first user device to the wireless beacon device via the short range wireless communication channel;
receiving, from the first user device, a request to access the network through the wireless router;
determining that the first user device is authenticated to access the network using the identifier and a second user device for a second user that administers the network; and
in response to determining, based on the identifier, that the first user device is authenticated to access the network, causing authorization of the first user device to access the network through the wireless router.

16. The non-transitory machine-readable medium of claim 15, wherein the operations further comprise:
causing the wireless beacon device to transmit network access credentials to the first user device to access the network through the wireless router, wherein the network access credentials are transmitted to the first user device using one or more data security protocols; and
removing the network access credentials from the first user device when the first user device is disconnected from the wireless beacon device.

17. The non-transitory machine-readable medium of claim 16, wherein the operations further comprise:
alerting the second user corresponding to the network of a check-in for the first user using the second user device, wherein the second user is authorized to revoke the network access credentials using the second user device.

18. The non-transitory machine-readable medium of claim 17, wherein the operations further comprise:
revoking the network access credentials from the first user device on instruction by the second user.

19. The non-transitory machine-readable medium of claim 18, wherein the second user device is not at the location, and wherein the second user is alerted over a cellular network connection with the second user device.

20. The non-transitory machine-readable medium of claim 15, wherein the wireless beacon device is range limited to a set distance corresponding to the location, and wherein the second user corresponding to the network adjusts the set distance.

* * * * *